(12) United States Patent
Straehle et al.

(10) Patent No.: US 8,416,399 B2
(45) Date of Patent: Apr. 9, 2013

(54) OPTICAL MEASURING INSTRUMENT USING BOTH REFLECTOMETRY AND WHITE-LIGHT INTERFEROMETRY

(75) Inventors: Jochen Straehle, Weissach (DE); Steffen Rath, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 691 days.

(21) Appl. No.: 12/631,419

(22) Filed: Dec. 4, 2009

(65) Prior Publication Data

US 2010/0183188 A1    Jul. 22, 2010

(30) Foreign Application Priority Data

Dec. 5, 2008    (DE) .......................... 10 2008 044 375

(51) Int. Cl.
*G01N 21/00* (2006.01)
*G01B 11/02* (2006.01)
*G01B 11/28* (2006.01)

(52) U.S. Cl. .......................... 356/73; 356/511; 356/630

(58) Field of Classification Search .................. 356/73, 356/503, 504, 511, 630, 632
See application file for complete search history.

(56) References Cited

U.S. PATENT DOCUMENTS

| | | | | |
|---|---|---|---|---|
| 6,137,575 | A * | 10/2000 | Sugiyama et al. | 356/503 |
| 6,633,389 | B1 * | 10/2003 | Poris et al. | 356/513 |
| 6,925,860 | B1 * | 8/2005 | Poris et al. | 73/105 |
| 7,724,375 | B1 * | 5/2010 | Novikov et al. | 356/498 |
| 8,199,332 | B2 * | 6/2012 | Pahk et al. | 356/503 |
| 2002/0097406 | A1 * | 7/2002 | Fielden et al. | 356/630 |
| 2005/0122529 | A1 | 6/2005 | Kim et al. | |
| 2006/0098206 | A1 | 5/2006 | Kim et al. | |

FOREIGN PATENT DOCUMENTS

DE    102006016131    3/2007

OTHER PUBLICATIONS

Ghim, Young-Sik et al., "Dispersive white-light interferometry for 3-D inspection of thin-film layers of flat panel displays", Proc. of SPIE, vol. 6616, Jun. 18, 2007, 8 pgs.
Ghim, Young-Sik et al., "Fast, precise, tomographic measurements of thin films," Applied Physics Letters, vol. 91, Aug. 27, 2007, pp. 001903-1-091903-3.
Kim, Daesuk et al., "Rapid Communication: Fast thickness profile measurement using a peak detection method based on an acousto-optic tunable filter", Measurement Science and Technology, vol. 13, 2002, pp. 1.1-1.5.
T. Drexel, G. Hausler, H. Venzke, "Three-dimensional sensing of rough surfaces by coherence radar," Applied Optics vol. 31, 919, 1992.
P. de Groot & L. Deck, Journal of Modern Optics, "Surface profiling by analysis of white-light interferograms in the spatial frequency domain," Journal of Modern Optics, vol. 42 389-401, 1995.

* cited by examiner

*Primary Examiner* — Michael A Lyons
(74) *Attorney, Agent, or Firm* — Kenyon & Kenyon LLP

(57) ABSTRACT

A method for determining the surface topography of a coated object and for the simultaneous spatially resolved determination of the thickness of the layer on the coated object. It is provided that the surface topography is measured with the aid of white-light interferometry, the thickness of the layer is measured by the principle of reflectometry, and by using, for both measurements, a shared radiation source having an electromagnetic radiation spectrum, which is reflected from the layer surface in a first wavelength range contained in the radiation spectrum and which penetrates into the layer in a second wavelength range contained in the radiation spectrum. Also described is a corresponding optical measuring instrument. The method and the optical measuring instrument make simultaneous highly accurate surface measurement of the surface topography and of the layer thickness of coated objects possible.

18 Claims, 2 Drawing Sheets

OPTICAL MEASURING INSTRUMENT USING BOTH REFLECTOMETRY AND WHITE-LIGHT INTERFEROMETRY

RELATED APPLICATION INFORMATION

The present application claims priority to and the benefit of German patent application no. DE 10 2008 044 375.1, which was filed in Germany on Dec. 5, 2008, the disclosure of which is incorporated herein by reference.

FIELD OF THE INVENTION

The present invention relates to a method for determining the surface topography of a coated object and for the simultaneous spatially resolved determination of the thickness of the layer on the coated object. The present invention furthermore relates to an optical measuring instrument for determining the surface topography of a coated object and for the simultaneous spatially resolved determination of the thickness of the layer on the coated object.

BACKGROUND INFORMATION

The high-precision measurement of surfaces with the aid of white-light interferometry is a standard measurement method, for example, in diesel injection technology for testing surfaces of components.

Seminal explanations of white-light interferometry are presented in T. Dresel, G. Hausler, H. Venzke, "Three-dimensional sensing of rough surfaces by coherence radar", Applied Optics Vol. 31, 919, 1992 and in P. de Groot & L. Deck, Journal of Modern Optics, "Surface profiling by analysis of white-light interferograms in the spatial frequency domain", Journal of Modern Optics, Vol. 42 389-501, 1995.

Furthermore, white-light interferometry may be used for determining the thickness of layers that are transparent to the radiation used.

German patent document DE 10 2006 016 131 A1 discusses an interferometric measuring device for measuring layer thicknesses of semi-transparent layers on substrates using a scanning device which scans these layers automatically in the direction of their depth (Z), with the aid of which an interference plane (IE) is displaceable relative to the layer structure, using an interferometer part (IT) having a white-light interferometer (WLI) and/or a wavelength-scanning interferometer (WLSI), to which an input radiation is supplied by an irradiation unit (LQ), the radiation being split by a beam splitter (ST) and supplied, on the one hand, to a reference arm (RA) via a reference beam path as a reference beam (RST) and, on the other hand, to an object arm (OA) having the layer structure at the time of the measurement via an object beam path as object beam (OST), having an image recorder (BA), which records the interfering radiation returned from the reference arm (RA) and the object arm (OA) and converts it into electrical signals, and having a downstream analyzer device (AW) for providing measurement results.

It is provided that the scanning device is designed in such a way that, with a constant reference beam path and object beam path, the corresponding scanning path is at least as long as the distance to be expected or ascertained in a pre-measurement between at least two consecutive boundary surfaces of the layer structure to be detected, optionally including an expected depth structure of the boundary surfaces to be expected, and that a) In designing the interferometer part (IT) having the irradiation unit (LQ) as white-light interferometer (WLI), the coherence length (LC) of the input radiation is selected to be at maximum such that the interference maxima of the correlograms occurring consecutively during the depth scanning are distinguishable on the boundary surfaces to be detected, and/or
b) In designing the interferometer part (IT) having the irradiation unit as a wavelength-scanning interferometer (WLSI), the irradiation unit (LQ) is designed for narrow-band, tunable input radiation, the bandwidth of the input radiation being selected such that the smallest distance to be expected or estimated via the pre-measurement of the consecutive boundary surfaces to be detected is resolvable, and/or
c) In designing the interferometer part (IT) as a wavelength-scanning interferometer (WLSI) having a spectrally broad-band irradiation unit and a wavelength-scanning optical spectrum analyzer as a detector, the bandwidth of the input radiation is selected such that the smallest distance to be expected or estimated via the pre-measurement of the consecutive boundary surfaces to be detected is resolvable, and
d) The wavelength spectrum used of the irradiation unit (LQ) is adapted to the spectral transparency of the layer to be measured in such a way that this layer is at least partially transparent to the radiation.

German patent document DE 10 2006 016 131 A1 furthermore discusses a method for interferometric measurement of layer thicknesses of semi-transparent layers on substrates, in which an interference plane (IE), which is determined by the optical path length of an object beam (OST) guided in an object beam path and by the optical path length of a reference beam (RST) guided in a reference beam path, is displaced relative to the position of the layer for depth scanning of the layer structure in the direction of depth (Z), and an interference pattern is generated using methods of white-light interferometry or of wavelength-scanning interferometry, and the interference pattern is recorded with the aid of an image recorder (BA) and automatically analyzed with the aid of an analyzer device (AW) in order to display the measurement results relating to the boundary surfaces of the layer structure.

It is provided that in depth scanning of the layer to be measured and of the boundary surfaces delimiting it, the object beam (OST) is guided over the same object beam path in a scanning cycle, and the reference beam (RST) is guided over the same reference beam path, and that, when using the method of white-light interferometry, the coherence length (LC) of the input radiation of an irradiation unit (LQ) injected into the interferometer is selected to be at maximum such that the interference maxima of the correlograms (KG) occurring consecutively on the boundary surfaces to be detected during depth scanning may be distinguished and, in using the method of wavelength-scanning interferometry, the bandwidth of the input radiation is selected such that the smallest distance to be expected or estimated by pre-measurement of the boundary surfaces to be detected is resolved, a wavelength spectrum of the irradiation unit (LQ) being selected for which the layer to be measured is at least partially transparent to the radiation.

In the interferometric measuring device and for carrying out the method, double correlograms of the radiation reflected by the layer surface and the layer back face must be analyzed. The disadvantage here is that only layers greater than approximately 2 μm may be measured, since otherwise the superimposition of the correlograms is no longer separable.

It is furthermore disadvantageous that only the thicknesses of layers transparent or at least semi-transparent to the light used or the electromagnetic radiation used may be measured. For measuring the layer thickness of carbon-based wear-protection layers, known as C layers, the document DE 10 2006 016 131 A1 therefore proposes that the wavelength spectrum of irradiation unit LQ be in the range of 1100 nm to 1800 nm. In this wavelength range, the C layers are semi-transparent due to their optical characteristics; therefore, on the top (air/C layer boundary surface) and on the bottom of the layer (C layer/substrate boundary surface) a detectable correlogram may be obtained. The limitation here also is that only layers having a thickness greater than approximately 2 µm may be measured, since otherwise the superimposition of the correlograms is no longer separable. It is furthermore necessary that the layer reflects a sufficient portion of the radiation on the surface and lets through a sufficient portion, which requires accurate adaptation of the wavelengths used and of the measuring device to the layer characteristics.

SUMMARY OF THE INVENTION

It is therefore an object of the exemplary embodiments and/or exemplary methods of the present invention to provide a method, using which the layer thickness and the depth structure of coated surfaces may be measured in a single operation and with a high degree of accuracy.

It is furthermore the object of the exemplary embodiments and/or exemplary methods of the present invention to provide a corresponding optical instrument.

An object of the exemplary embodiments and/or exemplary methods of the present invention concerning the method is achieved by measuring the surface topography with the aid of white-light interferometry, by measuring the thickness of the layer by the principle of reflectometry, and by using, for both measurements, a shared radiation source having an electromagnetic radiation spectrum, which is reflected from the layer surface in a first wavelength range contained in the radiation spectrum and which penetrates into the layer in a second wavelength range contained in the radiation spectrum.

The object of the exemplary embodiments and/or exemplary methods of the present invention concerning the optical instrument is achieved by designing the optical instrument as a combination of a white-light interferometer and a reflectometer having a shared radiation source and a shared measuring arm, via which the electromagnetic radiation is supplied to the coated object, by the radiation source having an electromagnetic radiation spectrum, which is reflected from the layer surface in a first wavelength range contained in the radiation spectrum and which at least partially penetrates into the layer in the second wavelength range contained in the radiation spectrum, and by providing a first optical element for splitting the electromagnetic radiation of the first wavelength range, reflected by the coated object and a reference mirror and subsequently superimposed into a first beam path for measuring the surface topography and the electromagnetic radiation of the second wavelength range into a second beam path for determining the layer thickness.

The use of the first wavelength range, reflected by the layer, of the electromagnetic radiation makes it possible to measure the surface topography of the object on the basis of white-light interferometry. In contrast, the use of the second wavelength range, penetrating into the layer, of the electromagnetic radiation makes it possible to measure the layer thickness on the basis of reflectometry.

Using white-light interferometry, a highly accurate measurement of the surface topography of the object may be performed. The layer thickness may be determined very accurately with the aid of reflectometry. The determination of layer thickness on the basis of reflectometry is not subject to the limitation existing for layer thickness measurement with the aid of white-light interferometry, according to which the minimum layer thickness to be determined is limited to approximately 2 µm due to the superimposed double correlograms which are no longer separable.

Using the method and the optical instrument, both the surface topography of a coated object and the layer thickness may be determined with high accuracy in a single operation.

By suitably selecting the wavelength ranges, the optical instrument may be adapted optimally to the optical characteristics of the layer to be examined and of the coated object. A first wavelength range, which is well reflected by the layer and does not penetrate into the layer, may be provided for white-light interferometry, while a second wavelength range, in which the layer is transparent and only a portion of the radiation is reflected from the layer surface, is selected for measuring the layer thickness.

For guiding the beam in the optical instrument, the same optical elements are used prior to splitting the electromagnetic radiation into the first beam path for measuring the surface topography and the second beam path for determining the layer thickness, which makes an advantageous design of the optical instrument and an accurate spatial allocation of the results of the white-light interference measurement and of the reflectometric measurement possible.

The simultaneous measurement of the surface topography and the layer thickness in using a single radiation source may be achieved by guiding the electromagnetic radiation of the first and second wavelength ranges within an optical instrument designed as a combination of a white-light interferometer and a reflectometer in shared beam paths in a measuring arm to the coated object and in a reference arm to a reference mirror, by combining and supplying, to a first optical element, the electromagnetic radiation reflected from the coated object and the electromagnetic radiation reflected from the reference mirror, by separating and deflecting into different beam paths, using the first optical element, the radiation of the first wavelength range and of the second wavelength range, and by supplying the first beam path of the first wavelength range belonging to the white-light interferometer to a first camera chip and the second beam path of the second wavelength range belonging to the reflectometer to a second camera chip.

The first camera chip detects the interfering radiation of the first wavelength range, i.e., the portion of the spectrum of the electromagnetic radiation which is reflected on the surface of the layer. A constructive or destructive interference occurs here if the optical path lengths in the measuring arm and in the reference arm are the same in the range of the coherence length of the wave packet. The relative distance between the reference mirror and the object is modified for carrying out the measurement. This results in a modulation of the radiation intensity of the particular pixels of the first camera chip, onto which a point of the object surface is mapped in the focal region or in the interference region of the white-light interferometer. The maximum of the correlograms thus obtained is corrected using the position of the displacement unit. For this purpose, suitable analysis software analyzes the spatially resolved correlograms recorded by the first camera chip and the position of the displacement unit. Depending on the precision of the displacement unit, the height value of the surface region of the coated object may be determined with a precision of a few nanometers.

For spatially resolved determination of the layer thickness, the signals of the individual pixels of the second camera chip are analyzed. The electromagnetic radiation of the second wavelength range penetrating into the layer is reflected to the object by both the surface of the layer and the boundary surface. The radiation component reflected by the boundary surface between the layer and the object interferes with the radiation component reflected by the surface of the layer after exiting from the layer. Depending on the wavelength of the radiation, the layer thickness, and the optical characteristics of the layer, the two radiation components are superimposed constructively or destructively, which is recorded by the second camera chip as corresponding intensity signals. The analysis of the intensity signals of the individual pixels of the second camera chip makes a highly accurate, spatially resolved determination of the layer thickness possible.

A dichroitic prism may be used as a first optical element. The dichroitic prism allows wavelength-dependent splitting of the electromagnetic radiation into the first beam path and the second beam path.

According to a particular embodiment variant of the present invention, it may be provided for determining the layer thickness that the wavelength of the electromagnetic radiation in the second beam path of the second wavelength range is tuned, using a second optical element, upstream from the second camera chip. Due to the uniform tuning of the wavelengths of the electromagnetic radiation of the second beam path, the frequency-dependent intensity signal on the second camera chip changes periodically. The layer thickness may be determined with the aid of this intensity modulation.

The second optical element is situated downstream from the first optical element, so that the electromagnetic radiation of the first wavelength range for interferometric determination of the surface topography is not affected by the second optical element.

A tunable optical filter may be used as the second optical element.

Exact determination of the layer thickness from the intensity curve of the radiation on the second camera chip is made possible by taking into account optical parameters of the layer when determining the thickness of the layer. Thus, in addition to the layer thickness, the refraction index of the layer, for example, affects the phase angle of the radiation component reflected on the boundary surface between the layer and the object compared to the radiation component reflected on the surface of the layer with corresponding effect on the intensity curve of the radiation interfered with.

For spatially resolved determination of the layer thickness, the surface of the object at the point where the layer thickness is measured must be mapped sharply on the second camera chip. Since not all object points are situated on the same plane, the second optical element must be activated from time to time for tuning the wavelength in the second beam path. Therefore, it may be provided that the second optical element is activated if at least one point on the surface of the coated object is in the focal region or in the interference region of the white-light interferometer due to the change in the optical path length in the measuring arm or in the reference arm. The information that one point is in the focal region or in the interference region of the white-light interferometer is obtained from the analysis of the white-light interferometer.

If it is provided that only the pixels of the second camera chip, onto which a point located in the focal region or in the interference region of the white-light interferometer is mapped, are analyzed for the particular layer thickness measurement, a time-consuming analysis of the entire image every time the tunable second optical element is activated may be avoided.

According to an alternative embodiment variant of the present invention, it may be provided that the thickness of the layer is determined at one point in time over the entire image field. The prerequisite for this is a sufficiently depth-sharp mapping of the object onto the second camera chip.

In particular for measuring the layer thickness of carbon-based wear-protection layers, known as C layers, on metallic surfaces, it may be provided that a radiation spectrum in a wavelength range of 300 nm to 1500 nm is used and that between 300 nm and 900 nm is used for white-light interferometry of the first wavelength range and between 900 nm and 1500 nm is used for reflectometry of the second wavelength range. The carbon layers are not transparent in the first wavelength range between 300 nm and 900 nm, located predominantly in the visible range, which makes the determination of the surface topography with the aid of white-light interferometry possible. In the near infrared range between 900 nm and 1500 nm, the C layers are semi-transparent due to their optical characteristics; therefore, a portion of the radiation is reflected both on the top (air/C layer boundary surface) and on the bottom of the layer (C layer/metal surface boundary surface).

A suitable design of the optical instrument as a combination of a white-light interferometer and a reflectometer may be achieved by supplying the electromagnetic radiation of the radiation source to a beam splitter, by supplying a first portion of the electromagnetic radiation, downstream from the beam splitter, to the coated object in the measuring arm and by supplying a second portion of the electromagnetic radiation to the reference mirror in a reference arm, by combining the electromagnetic radiation reflected by the coated object and by the reference mirror in the beam splitter and supplying it to the first optical element, by supplying the electromagnetic radiation of the first wavelength range downstream from the first optical element to a first camera chip, and by supplying the electromagnetic radiation of the second wavelength range downstream from the first optical element to a second optical element and subsequently to a second camera chip.

Up to the first optical element, the radiation of the first wavelength range and the second wavelength range follow the same optical paths. The first optical element separates the two wavelength ranges for the separate analysis on the basis of white-light interferometry and reflectometry.

The optical path length between the reference arm and the measuring arm is varied for determining the surface topography. In doing so, the coated object may be moved; however, moving the reference mirror or the position of the objective relative to the coated object is also possible. By moving the coated object, the different planes of the depth structure of the coated object successively enter the focal region or the interference region of the white-light interferometer. From the analysis of the light intensity of the individual pixels on the first camera chip, it may be ascertained which surface regions are located in the focal region or in the interference region of the white-light interferometer. If the object point passes through the interference or focal region of the white-light interferometer according to the coherence length of the radiation used, alternating high and low radiation intensities occur at the corresponding mapped point on the camera plane due to the constructive or destructive interference occurring with varying object position, the maximum of the envelope of the intensity fluctuations being used for determining the height of the object point. The height of the particular object point may be determined with high precision from the particular position of the displacement unit, according to the positioning accuracy of the displacement unit provided for displacing the object.

Since the first optical element separates the radiation components of the two wavelength ranges, none of the radiation from the second wavelength range, transparent to the layer, reflected by the boundary surface between the layer and the object surface reaches the first camera chip, so that double correlograms are avoided.

For determining the layer thickness, the interference of the radiation components of the second wavelength range reflected by the layer surface and by the boundary surface between the layer and the object surface are subjected to spatially resolved analysis with the aid of the second camera chip. The wavelength let through to the second camera chip may be continuously modified by the second optical element. During the uniform tuning of the wavelength, the frequency-dependent intensity signal varies periodically. The layer thickness may be very accurately determined using the modulation, taking into account specific layer characteristics such as the refraction index.

The wavelength ranges may be separated and the wavelength may be tuned upstream from the second camera chip by designing the first optical element as a dichroitic prism and/or the second optical element as a tunable optical filter.

It is provided that the first camera chip and/or the second camera chip are/is designed as a CMOS camera, so that the individual pixels of the camera chip may be activated and analyzed separately.

Interference, for example, by external light, may be avoided by making the first camera chip sensitive to the first wavelength range and the second camera chip sensitive to the second wavelength range.

According to a particular embodiment variant of the present invention, it may be provided that analysis software is provided for analyzing the signals of the first camera chip for determining the surface topography and layer thickness analysis software is used for analyzing the signals of the second camera chip for determining the thickness of the layer, and that a function for activating the second optical element is provided in the analysis software if at least one region of the surface of the coated object is in the interference region or in the focal region of the white-light interferometer, and/or a function is provided in the analysis software for transmitting the pixels located in the interference region or in the focal region of the white-light interferometer to the layer thickness analysis software.

The layer thickness is advantageously measured for the object points which are located in the focal region or in the interference region of the white-light interferometer.

Activating the second optical element as soon as at least one object point reaches the interference region or the focal region of the white-light interferometer makes it possible to measure the layer thickness for this object point. At the same time, the analysis software specifies to the layer thickness analysis software which object point(s) is/are and thus which pixels are located in the interference region or in the focal region right now and must be analyzed. When using CMOS cameras using which the camera pixels may be individually analyzed, so that only the pixels located in the focus are analyzed, a time-consuming analysis of the entire image field may be avoided.

According to an alternative embodiment variant of the present invention, it may be provided that for mapping the coated object, an objective having a great depth of sharpness is used. If the entire coated object appears to be sufficiently sharp for layer thickness measurement, the thickness may be measured in the entire image field at one point in time. In this case, it may be advantageous to vary the optical path length between the measuring arm and the reference arm by moving the reference mirror.

The method or the optical instrument may be used for determining the surface topography and the layer thickness of carbon-coated metallic surfaces. Such so-called C layers are often used in the automobile industry as wear-protection layers for high-precision metallic components.

The exemplary embodiments and/or exemplary methods of the present invention is elucidated below in greater detail with reference to the exemplary embodiments depicted in the figures.

DETAILED DESCRIPTION

Figure 1:
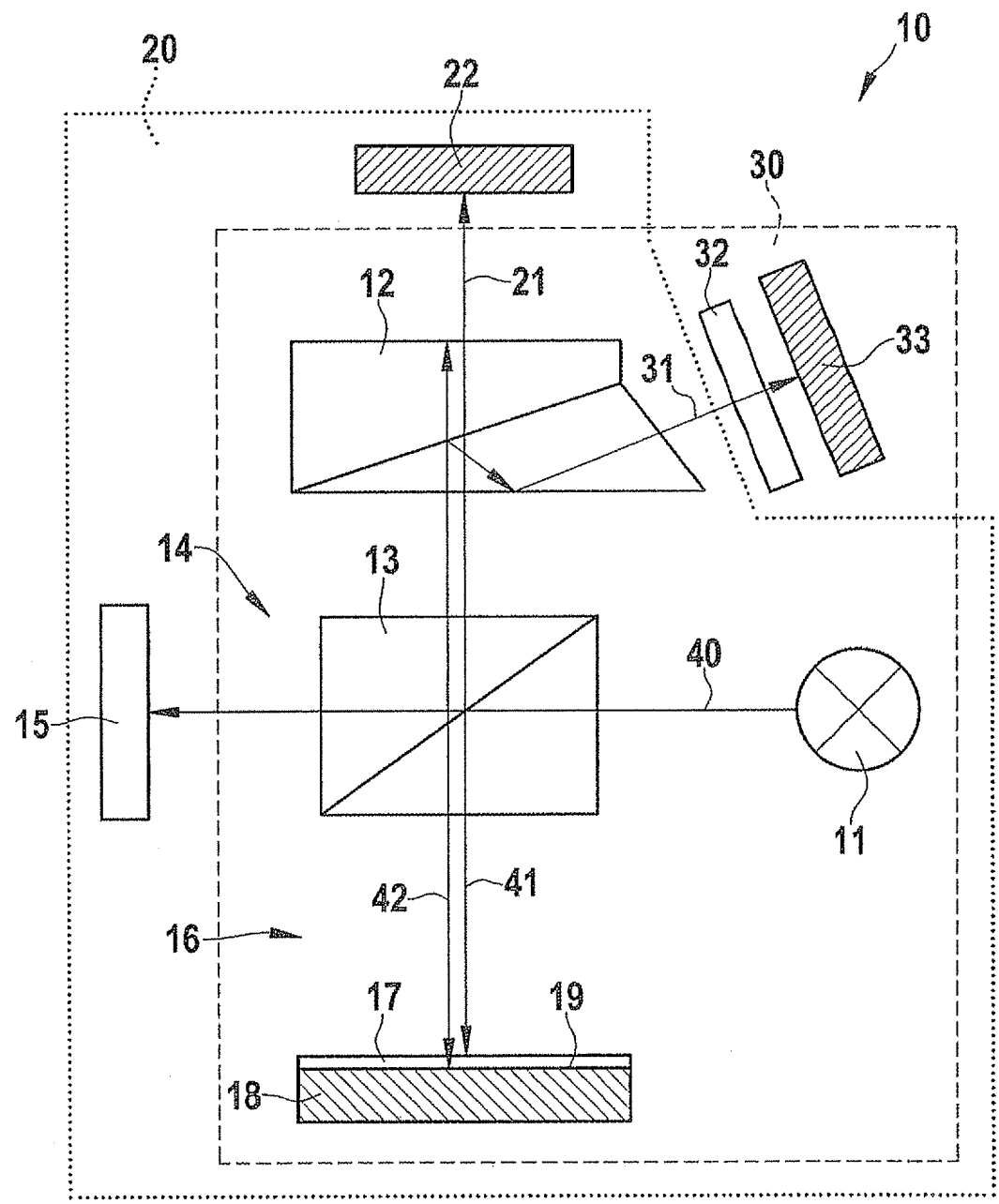
FIG. 1 shows an optical instrument for determining the surface topography of coated objects and for simultaneously determining the thickness of the layer on the object.

FIG. 1 shows an optical instrument 10 for determining the surface topography of coated objects 18 and for simultaneously determining the thickness of a layer 17 on the coated object 18.

Optical instrument 10 corresponds, in its basic design, to a combination of a white-light interferometer 20 and a reflectometer 30, whose particular components are limited to their borders in the illustration.

Electromagnetic radiation 40 of a shared radiation source 11 is split by a beam splitter 13 into a reference arm 14 and a measuring arm 16. A reference mirror 15 is situated at the end of reference arm 14. Coated object 18 to be measured having layer 17 facing the beam path is located at the end of measuring arm 16. In the depicted exemplary embodiment, coated object 18 is a metallic component having a carbon coating with a boundary surface 19 therebetween.

Electromagnetic radiation 40 is illustrated in measuring arm 16 as a first radiation component 41 and a second radiation component 42. First radiation component 41 corresponds to a first wavelength range 51 illustrated in FIG. 2, and second radiation component 42 corresponds to a second wavelength range 52, illustrated in FIG. 2, of radiation spectrum 52, of electromagnetic radiation 40, also illustrated in FIG. 2.

Electromagnetic radiation 40, guided in reference arm 14, also contains first radiation component 41 and second radiation component 42, not illustrated.

Subsequently, electromagnetic radiation 40 having first radiation component 41 and second radiation component 42 is supplied to a first optical element 12. First optical element 12 is designed as a dichroitic prism. In first optical element 12, first radiation component 41 is separated from second radiation component 42. First radiation component 41 is supplied to a first camera chip 22, belonging to white-light interferometer 20, via a first beam path 21. Second radiation component 42 is supplied, via a second beam path 31, to a second optical element 32 and then to a second camera chip 33. Second optical element 32 and second camera chip 33 are associated with reflectometer 30. Second optical element 32 is formed by a tunable filter, whose wavelength-dependent transmission may be adjusted at least within second wavelength range 54.

Figure 2:
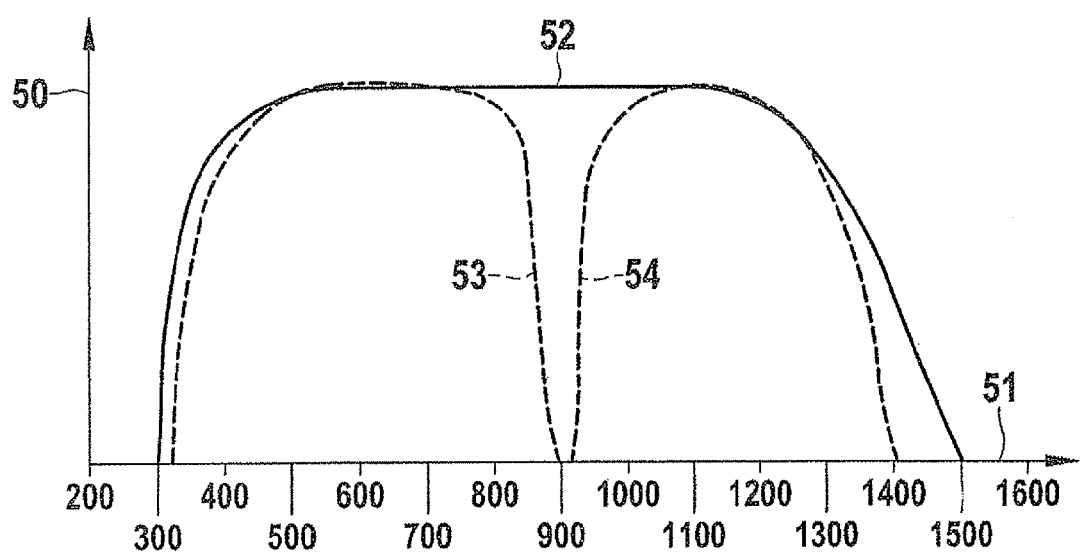
FIG. 2 shows a radiation spectrum of a shared radiation source.

FIG. 2 shows a radiation spectrum 52 of shared radiation source 11 depicted in FIG. 1. Radiation spectrum 52 is depicted in a diagram, in which radiation intensity 50 is illustrated plotted against wavelength 51. Radiation spectrum 52 is composed of a first radiation component 41 in a first wavelength range 53 depicted in FIG. 1, and a second radiation component 42, also depicted in FIG. 1, in a second wavelength range 54.

As FIG. 1 shows, first wavelength range 53 of first radiation component 41 is such that it does not penetrate into layer 17 on coated object 18, but is reflected from the surface of layer 17. In contrast, second wavelength range 54 of second radiation component 42 is adjusted to the optical characteristics of layer 17 in such a way that it penetrates into layer 17, at least partially, and is reflected on boundary surface 19 between layer 17 and coated object 18. The remaining portion of second radiation component 42, which does not penetrate into layer 17, is reflected on the surface of layer 17.

The surface topography of coated object 18 is determined with the aid of white-light interferometry using first radiation component 41 reflected on the layer surface. First radiation component 41 reflected from the layer surface is superimposed on electromagnetic radiation 40 reflected by reference mirror 15 in beam splitter 13 and interferes with first radiation component 41, contained therein, of first wavelength range 53 if the optical path lengths within reference arm 14 and measuring arm 16 are the same in the range of the coherence length of electromagnetic radiation 40 of first radiation component 41. This interfering first radiation component 41 is separated from second radiation component 42 in first optical element 12 and supplied to first camera chip 22 via first beam path 21.

In order to perform a measurement, the optical path length in reference arm 14 or in measuring arm 16 is varied by a displacement unit (not illustrated). For the illustrated embodiment variant of the present invention, it is advantageous if the position of coated object 18 is modified; the description therefore refers to this specific embodiment. It is, however, also possible to modify the position of reference mirror 15 or the position of an objective (not illustrated).

By changing the position of coated object 18, the different regions of the surface of coated object 18 pass through the interference region or the focal region of white-light interferometer 20 as a function of the depth structure of the surface. For the regions located exactly in the interference region or the focal region of white-light interferometer 20, constructive or destructive interference occurs, which results in a clear-cut modulation of the radiation intensity in the corresponding mapping regions on first camera chip 22.

First camera chip 22 is designed as a CMOS camera. CMOS cameras make it possible to individually activate and analyze the individual pixels of the camera. Appropriate analysis software allows the intensity fluctuations in the individual pixels of first camera chip 22 to be analyzed. The maximum of the intensity fluctuation is corrected using the position of the displacement unit. Depending on the precision of the displacement unit, the height values of the surface regions of the coated object 18 mapped onto the individual camera pixels may thus be determined with a precision of a few nanometers.

The thickness of layer 17 on coated object 18 is determined by the principle of reflectometry using second radiation component 42 penetrating into layer 17. Second radiation component 42 penetrates into layer 17 to a certain degree dependent on the optical characteristics of layer 17, and is reflected on boundary surface 19 to the substrate. The portion of second radiation component 42 which does not penetrate into layer 17 is reflected on the layer surface. The components of second radiation component 42 reflected on boundary surface 19 and the layer surface interfere, as a function of the layer thickness, the particular wavelength, and the optical characteristics of layer 17 and of boundary surface 19. This interfering second radiation component 42 is separated from first radiation component 41 in first optical element 12 and supplied to second optical element 32 and second camera chip 33 via second beam path 31.

In order to perform a measurement, the wavelength of second radiation component 42 transmitted by second optical element 32 is uniformly tuned by second optical element 32 in second beam path 22. Therefore, during a measurement cycle, the different wavelengths of second radiation component 42 reach second camera chip 33 consecutively via the tunable filter.

During the uniform tuning, the frequency-dependent intensity signal of the individual pixels on second camera chip 33 varies periodically. The layer thickness may be determined using the modulation, taking into account specific layer characteristics such as the refraction index of the layer.

The spatially resolved analysis of the individual mapping regions of coated object 18 on second camera chip 33 make it possible to associate the layer thickness with the particular surface region of coated object 18. The information on the locally detected layer thicknesses may be combined with the results of the locally detected height profiles from white-light interferometry.

If an objective (not depicted) having sufficient depth of sharpness is used, so that the entire object is mapped on second camera chip 33 sufficiently sharply, the layer thickness may be measured for the entire image field at one point in time.

Otherwise the layer thickness is measured for the surface regions of coated object 18 which are located in the focal region of optical instrument 10. For this purpose, second optical element 32 must be activated as soon as a new region of the object surface reaches the focal region due to the movement of coated object 18. The information whether and which regions are located in the focal region or in the interference region of optical instrument 10 is obtained via the interference measurement of white-light interferometer 20. The focal region usually corresponds to the interference region of white-light interferometer 20. The analysis software of white-light interferometer 20 is advantageously expanded by one function, which sends a signal to second optical element 32 and activates the latter as soon as an interference signal occurs. This triggers a layer thickness measurement as soon as a surface region of coated object 18 reaches the focal region of optical instrument 10.

Second camera chip 33 is also designed as a CMOS camera, which here also makes separate activation and analysis of the individual pixels of second camera chip 33 possible. The signals of the individual pixels of second camera chip 33 are analyzed via layer thickness analysis software (not depicted). In addition to signaling to second optical element 32 via the analysis software of white-light interferometer 20 that a surface region of coated object 18 is in the interference region of white-light interferometer 20 and thus in the focal region of optical instrument 10, the analysis software may transmit to the layer thickness analysis software which pixels are located in the focal region and which pixels of second camera chip 33 must be analyzed in the instantaneous position of coated object 18. The time-consuming analysis of the entire image field may thus be avoided.

High-precision shape and/or roughness measurement of coated objects may thus be performed by surface measurement using optical instrument 10 with the aid of white-light interferometry. At the same time, important layer thickness information may be obtained in combination with reflectometry-based layer thickness measurement.

Depending on the transparency of layer 17, the wavelength range of the shared radiation source 11, first wavelength range 53 used for white-light interferometry, and second wavelength range 54 used for reflectometry must be adjusted. First wavelength range 53 provided for white-light interferometry should not penetrate into the surface; second wavelength range 54 provided for layer thickness measurement must penetrate.

Using optical instrument 10, surfaces and layer thicknesses of coated objects 18 may be rapidly measured with high accuracy in a single operation.

What is claimed is:

1. A method for determining a surface topography of a coated object and for providing a simultaneous spatially resolved determination of a thickness of a layer on the coated object, the method comprising:
   measuring the surface topography with white-light interferometry; and
   measuring the thickness of the layer by reflectometry;
   wherein, for both measurements, a shared radiation source is used having an electromagnetic radiation spectrum, which is reflected from a layer surface in a first wavelength range contained in the radiation spectrum and which penetrates into the layer in a second wavelength range contained in the radiation spectrum.

2. The method of claim 1, wherein the electromagnetic radiation of the first and second wavelength ranges is guided within an optical measuring instrument configured as a combination of a white-light interferometer and a reflectometer in shared beam paths in a measuring arm to the coated object and in a reference arm to a reference mirror, the electromagnetic radiation reflected from the coated object and the electromagnetic radiation reflected from the reference mirror being combined and supplied to a first optical element, the radiations of the first wavelength range and of the second wavelength range being separated and deflected into different beam paths by the first optical element, with a first beam path of the first wavelength range associated with the white-light interferometer being supplied to a first camera chip and a second beam path of the second wavelength range associated with the reflectometer being supplied to a second camera chip.

3. The method of claim 2, wherein the first optical element is a dichroitic prism.

4. The method of claim 2, wherein the wavelength of the electromagnetic radiation in the second beam path of the second wavelength range is tuned by a second optical element upstream from the second camera chip.

5. The method of claim 4, wherein a tunable optical filter is used as the second optical element.

6. The method of claim 4, wherein the second optical element is activated if at least one point on the surface of the coated object moves into a focal region or into an interference region of the white-light interferometer due to a change in an optical path length in the measuring arm or in the reference arm.

7. The method of claim 2, wherein for layer thickness measurement, only those pixels of the second camera chip are analyzed onto which a point of the surface of the coated object located in a focal region or in an interference region of the white-light interferometer is mapped.

8. The method of claim 1, wherein optical parameters of the layer are taken into account when determining the thickness of the layer.

9. The method of claim 1, wherein the thickness of the layer is determined at one point in time over an entire image field.

10. The method of claim 1, wherein a radiation spectrum in a wavelength range of 300 nm to 1500 nm is used and for white-light interferometry the first wavelength range of between 300 nm and 900 nm is used, and for reflectometry the second wavelength range of between 900 nm and 1500 nm is used.

11. The method of claim 1, wherein the surface topography and the layer thickness of a carbon-coated metallic surface are determined.

12. An optical measuring instrument for determining the surface topography of a coated object and for providing a simultaneous spatially resolved determination of the thickness of the layer on the coated object, comprising:
   a white-light interferometer and a reflectometer having a shared radiation source and a shared measuring arm, via which the electromagnetic radiation is supplied to the coated object, the radiation source having an electromagnetic radiation spectrum, which is reflected from the layer surface in a first wavelength range contained in the radiation spectrum and which at least partially penetrates into the layer in a second wavelength range contained in the radiation spectrum; and
   a first optical element for splitting the electromagnetic radiation of the first wavelength range reflected by the coated object and by a reference mirror and subsequently superimposed into a first beam path for measuring the surface topography and the electromagnetic radiation of the second wavelength range into a second beam path for determining the layer thickness.

13. The optical measuring instrument of claim 12, wherein the electromagnetic radiation of the radiation source is supplied to a beam splitter, downstream from the beam splitter, a first portion of the electromagnetic radiation in the measuring arm is supplied to the coated object and a second portion of the electromagnetic radiation in a reference arm is supplied to the reference mirror, the electromagnetic radiation reflected by the coated object and by the reference mirror is combined in the beam splitter and supplied to the first optical element, the electromagnetic radiation of the first wavelength range downstream from the first optical element is supplied to a first camera chip, and the electromagnetic radiation of the second wavelength range downstream from the first optical element is supplied to a second optical element and subsequently to a second camera chip.

14. The optical measuring instrument of claim 13, wherein at least one of the first optical element is a dichroitic prism and the second optical element is a tunable optical filter.

15. The optical measuring instrument of claim 13, wherein at least one of the first camera chip and the second camera chip is a CMOS camera.

16. The optical measuring instrument of claim 13, wherein the first camera chip is sensitive to the first wavelength range, and the second camera chip is sensitive to the second wavelength range.

17. The optical measuring instrument of claim 13, wherein analysis software analyzes signals of the first camera chip for determining the surface topography, and layer thickness analysis software analyzes the signals of the second camera chip for determining the thickness of the layer, and the analysis software includes at least one of a function for (i) activating the second optical element if at least one region of the surface of the coated object moves into an interference range or into a focal range of the white-light interferometer, and (ii) transmitting pixels located in one of the interference range and the focal range of the white-light interferometer to the layer thickness analysis software.

18. The optical measuring instrument of claim 12, wherein an objective having a great depth of sharpness is used for mapping the coated object.

* * * * *